Oct. 2, 1928.
R. O. OAKLEY
1,686,101
FILLER WEATHER STRIP
Filed April 28, 1926
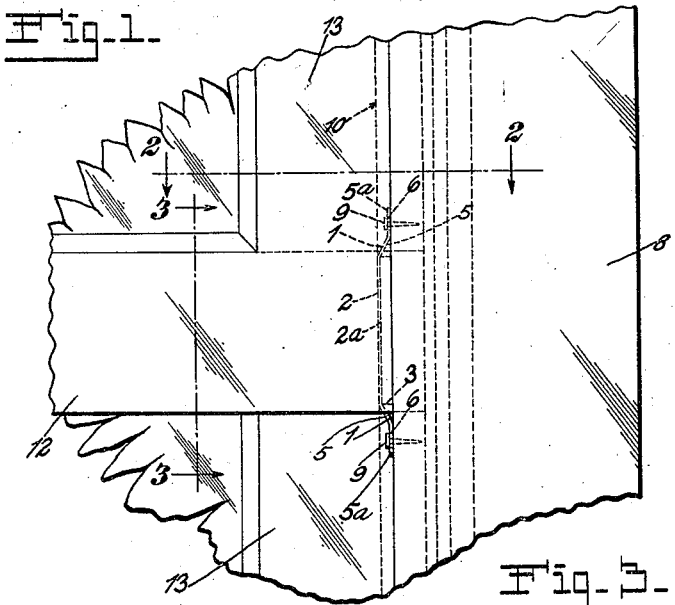
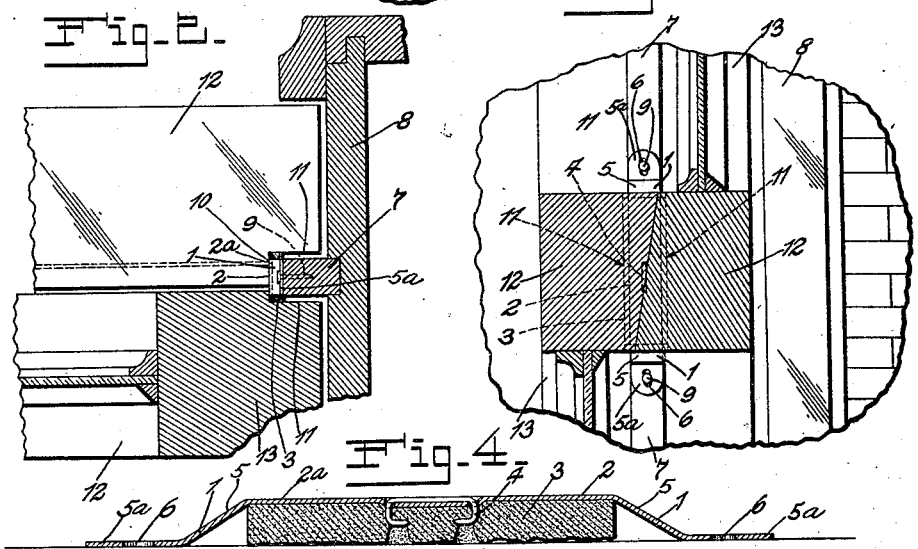
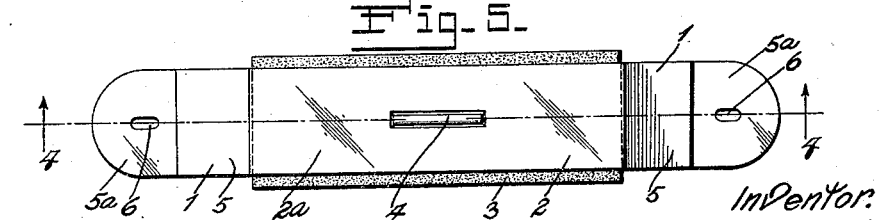
Inventor:
Richard O. Oakley,
by J. Henry Kimoly
His Attorney.

Patented Oct. 2, 1928.

1,686,101

UNITED STATES PATENT OFFICE.

RICHARD O. OAKLEY, OF ST. LOUIS, MISSOURI.

FILLER WEATHER STRIP.

Application filed April 28, 1926. Serial No. 105,165.

My invention relates to filler weatherstrips and more particularly to filler weatherstrips which are so constructed that they are complementary of the ordinary metal weatherstripping used to make windows weathertight and which may be applied in the space between the bottom and sides of the notch, in the ends of the meeting rails of a window sash, and the parting bead of the window to more effectually prevent any substantial flow of air around the ends of the meeting rails.

Heretofore, weatherstrips have been provided in an effort to prevent this flow of air between the parting bead and the bottom of the notch cut in the ends of the meeting rails, but such weatherstrips as have been provided only partially prevented the flow of air between the parting bead of the window and the bottom of the notch, because of deficiencies in structure hereinafter more fully set forth, and these weatherstrips did not at all prevent a flow of air between the parting bead and the sides of the notch.

Such weatherstrips as have been provided have comprised a substantially flat front member having fastened thereto by any one of a number of different means a strip of compressible material. When such a weatherstrip was attached to a parting bead the attaching screws or nails passed through the ends of the front member to draw the ends thereof down into contact with the parting bead and the compressible material caused the middle of the front member to be held away from the parting bead and, therefore, the front member assumed a bowed or arcuate shape and only a small area of contact was had between the bowed weatherstrip and the bottom of the notch in the meeting rails. This contacting area was not sufficient to prevent a flow of air between the parting bead and the bottom of this notch.

My co-pending application, Serial No. 750,366, filed December 11, 1924, is for a filler weatherstrip designed to obviate this deficiency in that the weatherstrip described and claimed therein has a front member and a body portion of compressible material of less length than the front member and the ends of the front member are inclined inwardly at the ends of the body portion and these inclined ends are arranged to be attached to the parting bead of the window on which the weatherstrip is applied. However, in the embodiment of the invention shown in the drawings of that application the ends are only inclined inwardly about half of the thickness of the body portion since ordinary soft felt would be compressed to about half its thickness when in operative position on a window and in which case the contacting portion of the front member would remain flat and substantially parallel to the face of the parting bead. However, it has been found that some grades of felt are too stiff and compact to allow a compression of one half of its thickness and if the body member be made of this grade of felt the contacting portion of the front member would be held farther away from the parting bead when the weatherstrip was applied on a window than was designed and this would cause the contacting portion to be slightly bowed and thereby have, to a slight extent, the deficiency of the other form of weatherstrips described above.

The object of this invention is to provide a filler weatherstrip adapted to be applied on the parting bead of a window at a point to register with the ends of the meeting rails when the window sash are in closed position and which weatherstrip when so mounted has a comparatively long, flat contacting portion disposed and arranged to contact at all times and throughout its entire length with the bottom of the notch cut in the meeting rails and which weatherstrip is also disposed and arranged to effectually prevent a flow of air between the parting bead and the sides of this notch.

My invention is more fully shown in the accompanying drawings wherein similar characters are used to designate similar parts: Fig. 1 is a fragmentary elevation of the outside of a window on which one form of my new and improved filler weatherstrip has been applied; Figs. 2 and 3 are partial sections along the lines 2—2 and 3—3, respectively, in Fig. 1; Fig. 4 is a sectional view of my new and improved filler weatherstrip taken along the lines 4—4 in Fig. 5; and Fig. 5 is a plan view of the weatherstrip.

Referring to the figures the embodiment of my new and improved weatherstrip 1 shown therein and more particularly in Figs. 4 and 5 comprises a front member 2 and a body member 3 of felt or some other compressible material, secured to the front member by the staple 4 or any other suitable means. However, I prefer that in no case shall the fastening means used extend entirely through the thickness of the body member 3. The purpose of this is fully outlined in my copending application mentioned above.

The front member 2 is of greater length than the body member 3 and has a flat contacting portion 2ª of substantially the same length as the body member 3 and also has the ends 5 thereof inclined inwardly at the ends of the body member, as shown in Fig. 4, to form attaching portions 5ª which extend outwardly beyond the ends of the body member and are positioned in a plane parallel to the contacting portion 2ª and removed therefrom a distance substantially equal to the thickness of the body member. Each of the attaching portions 5ª has therein a hole 6.

My new and improved weatherstrip is especially adapted, as stated above, to be used on windows which have had any of the many forms of weatherstrips, not shown in the drawings, applied between the window frame and the top, sides and bottom of the window sash, and is adapted to be applied on the face of the parting bead 7 of a window frame 8 by means of nails 9 or any other suitable fastening means, one of which is forced into the parting bead through the hole 6 in each of the attaching portions 5ª. A weatherstrip is secured to the parting bead 7 at each side of the window at a point to register with the bottom 10 and the sides 11 of a notch cut in the ends of the meeting rails 12 of the sash 13 when the sash are in closed position. After the weatherstrip has been so applied and when the sash are moved into closed position the bottom 10 of the notch cut in the ends of the meeting rails 12 will engage with the contacting portion 2ª of the front member 2. I prefer that the weatherstrip be constructed and arranged so that when applied the contacting portion 2ª is substantially parallel to the face of the parting bead 7, and since the bottom 10 of the notch in the meeting rails is usually substantially parallel to the face of the parting bead the contacting portion will be also substantially parallel to the bottom of the notch and, therefore, the bottom of the notch will engage with the contacting portion 2ª substantially throughout the entire length thereof.

I prefer that the body member 3 be of a thickness so that when the bottom of the notch engages with the contacting portion 2ª it will compress the body member 3 and, when this occurs the front member 2 will be pressed inwardly with a resultant outward longitudinal movement of the attaching portions 5ª. Also, I prefer that the holes 6 be elongated longitudinally of the weatherstrip or otherwise enlarged so that the attaching portions 5ª are allowed to move in relation to the nails 9 and into the position shown in Fig. 3, when the weather strip is in operative position on a window and compressed as described above. In order that the pressure of the bottom 10 of the notch does not distort the weatherstrip but will cause this outward longitudinal movement of the attaching portions 5ª, I prefer that the ends 5 of the weatherstrip be shaped so that the inclined portion of the ends will be arranged at an angle of less than forty five degrees to the face of the parting bead.

In addition to being designed to provide a substantially long, flat surface contacting with the bottom 10 of the notch cut in the meeting rails whereby a flow of air is effectually prevented between the face of the parting bead and the bottom of the notch, my new and improved weatherstrip is also designed and adapted to effectually prevent a flow of air between the sides of the parting bead and the sides 11 of the notch. To accomplish this result I prefer that the front member 2 be of a width not greater than that of the parting bead on which the weatherstrip is applied and that the body member 3 be of greater width than the parting bead so that a part of it will project outwardly from each side thereof. When the window sash are closed and the contacting portion 2ª of the weather strip engages the bottom 10 of the notch in the meeting rails and the contacting portion 2ª is moved inwardly toward the face of the parting bead 7 with a resultant compression of the body member 3 the body member will be spread sidewise so that the parts thereof projecting outwardly from each side of the parting bead will be caused to project still farther and will engage with the sides 11 of the notch cut in the ends of the meeting rails to make a substantially air-tight fit therewith. Since, my weatherstrip is especially adapted to be used on windows which have already been provided with the usual weatherstripping between the window frame and the window sash any flow of air that may pass downwardly or upwardly past the ends of the meeting rails 12 and along the window frame 8 will then be prevented from passing inwardly by the weatherstripping between the sides of the sash and the frame. As may be readily seen from Fig. 2 of the drawing, a flow of air around the ends of the meeting rails 12 will be prevented by my new filler weatherstrip and a substantially air-tight joint will be provided at the ends of the meeting rails and the frame.

It may be readily understood that I do not intend to limit my invention to the exact details of construction shown in the drawings since the form and shape of the various parts may be varied within wide limits without deviating from the spirit of my invention as appears in the claims below.

What I claim as new and desire to secure by Letters Patent, is:—

1. A filler weatherstrip applied between the parting bead of a window and the bottom and sides of a notch cut in the meeting rails of the window sash and comprising a front member and a body member of compressible material secured thereto, said front member having a contacting portion and attaching portions extending beyond said body member and positioned in a plane substantially parallel to the plane of said contacting portion and removed therefrom a distance substantially equal in thickness of said body member, and said attaching portion having a hole therein through which is passed the attaching means for securing the weatherstrip to said parting bead, said hole being larger than said attaching means.

2. A filler weatherstrip applied between the parting bead of a window and the bottom and sides of a notch cut in the meeting rails of a window sash and comprising a front member and a body member of compressible material secured thereto, said front member having a contacting portion substantially the same length as said body member and substantially parallel to the bottom of said notch, and said front member having the ends thereof inclined inwardly at the ends of said body member, said ends being shaped and arranged to form attaching portions positioned in a plane substantially parallel to the plane of said contacting portion and removed therefrom a distance substantially equal to the thickness of said body member, each of said attaching portions having an elongated hole therein through which is passed the means for securing the weatherstrip to the parting bead, said body member being of greater width than said parting bead and having a part thereof projecting outwardly at each side of said parting bead, and said weatherstrip being positioned and arranged so that said front member will contact with the bottom of said notch and the projecting parts of said body member will contact with the sides of said notch.

In witness whereof I have signed my name to this specification.

RICHARD O. OAKLEY.